United States Patent [19]

Shimizu et al.

[11] 3,928,414
[45] Dec. 23, 1975

[54] ALICYCLIC ACID AND DERIVATIVES THEREOF

[75] Inventors: Katsuhisa Shimizu, Kyoto; Shuhei Ishibe, Nara; Toshiharu Okumichi, Amagasaki; Keizo Matsumoto, Osaka, all of Japan

[73] Assignee: Arakawa Rinsan Kagaku Kogyo Kabushiki Kaisha, Osaka, Japan

[22] Filed: Dec. 13, 1973

[21] Appl. No.: 426,935

[30] Foreign Application Priority Data
Dec. 16, 1972   Japan.............................. 47-126346

[52] U.S. Cl........... 260/469; 106/287; 260/247.2 R; 260/295 S; 260/464; 260/465 R; 260/468 G; 260/501.1; 260/501.17; 260/514 G; 260/515 R; 260/558 R
[51] Int. Cl.².................... C07C 63/00; C07C 69/76
[58] Field of Search............. 260/469, 515 R, 501.1, 260/501.17

Primary Examiner—Lorraine A. Weinberger
Assistant Examiner—Jane S. Myers
Attorney, Agent, or Firm—Bierman & Bierman

[57] ABSTRACT

A resin having a formula of

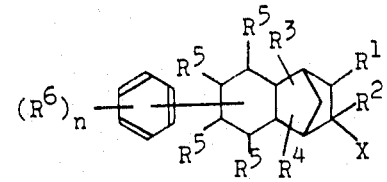

wherein each of $R^1$, $R^2$, $R^3$ and $R^4$ is a hydrogen atom or methyl group, $R^5$ represents a hydrogen atom or alkyl group having 1 to 4 carbon atoms and four $R^5$'s may be the same or different, $R^6$ is an alkyl group having 1 to 6 carbon atoms, $n$ is 0 or an integer of 1 to 5 and X is —CN, —CONH$_2$, —COOM or —COOR$^a$, M being a hydrogen atom, alkali metal, —NH$_4$ or organic amine residue, $R^a$ being an alkyl group having 1 to 4 carbon atoms; and a method for manufacturing the same said resin being useful as substitutes for rosin and its derivatives.

6 Claims, 6 Drawing Figures

Retention Time (min.)
(Column Temp. 120°c)

Retention Time (min.)
(Column Temp. 200°C)

ALICYCLIC ACID AND DERIVATIVES THEREOF

This invention relates to a novel resin and manufacturing the same, more particularly to a novel resin usable as substitutes for rosin as well as for derivatives thereof and a process for producing the same. The present invention further pertains to a composition containing the novel resin, which is especially useful as emulsifier for producing synthetic rubber by emulsion polymerization and as sizing agent for paper.

As already known, rosin comprises resin acids including abietic acid represented by the formula

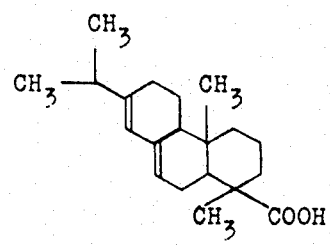

and structural isomers thereof. Because the alkali salt of the resin acid exhibits an excellent surface activity of the anion type and is moreover in the form of a resinous substance having one carboxyl group and alicyclic structure, it not only gives high surface activity but also materially improves the quality of industrial materials such as other resins, rubbers, fibers and the like when incorporated therein. For instance, when an alkali salt of rosin is used as an emulsifier for the emulsion polymerization to produce styrene-butadiene rubber (SBR) or acrylonitrile-butadiene rubber (NBR), rosin gets incorporated in SBR or NBR to improve the workability of the resulting product, giving a tackifying effect to the same. The alkali salt is therefore used universally for industrial purposes. Before application to such uses, the rosin is pretreated to stabilize the conjugated double bond in the molecule by disproportionation reaction in order that the rosin will not inhibit radical polymerization.

In paper making process, an alkali salt of rosin is added to pulp prior to sheet forming step in an amount of 0.1 to 2 wt. % based on the pulp to obtain sized paper which is free of feathering when written on in water-based ink. The sizing agent gives much greater effect than other similar surface active agents such as alkali salts of fatty acids. For industrial purposes, fortified rosin sizes are extensively used which are prepared by reacting maleic acid with part of rosin through addition reaction, followed by conversion to alkali salt.

Rosin is soluble in various solvents and has good compatibility with various high molecular weight substances. Further, rosin displays better compatibility with a wider variety of high molecular weight substances than in the case of other resins and, because it is a resin, it gives peculiar effect as distinct from the effect achieved by the use of oily substances. For instance, when incorporated in resin or rubber, oily substances chiefly produce a plasticizing effect while resinous substances mainly exhibit tackifying effect. Accordingly, rosin or ester thereof with a polyhydric alcohol like glycerin is conjointly used with rubbers or plastics to produce pressure sensitive adhesives, hotmelt adhesives and the like. Further rosin is modified by esterification with polyhydric alcohols or by converting it to a polyvalent metal salts such as calcium or zinc salt. The resin thus obtained is used widely in coating compositions, printing inks and adhesives.

However, rosin has the disadvantage as a naturally occurring material that its supply is not stable and there is no possibility of increased production.

It is therefore a matter of great importance in the art to synthesize a rosin-like resin having properties and characteristics similar to those of rosin.

A main object of the invention is accordingly to provide a novel rosin-like resin having properties and characteristics similar to those of rosin and capable of being used as susbtitutes for rosin as well as derivatives thereof.

Another object of the invention is to provide a process for manufacturing a rosin-like resin having the above properties and characteristics from materials easily available on a commercial scale.

Another object of the invention is to provide a composition containing a novel rosin-like resins which can be used for a wide variety of purposes as substitutes for compositions containing rosin or its derivatives, such as emulsifiers for producing synthetic rubber by emulsion polymerization, sizing compositions for paper, pressure sensitive adhesives, hotmelt adhesives, coating compositions, printing inks and the like.

Another object of the invention is to provide an emulsifying composition for producing synthetic rubber by emulsion polymerization, which is similar to or superior to conventional emulsifiers containing disproportionated rosin.

Another object of the invention is to provide a sizing composition for paper, which displays more excellent sizing effect as compared not only with conventional rosin sizes but also with fortified rosin sizes.

These and other advantages and objects of the present invention will be apparent from the following description.

The resin of this invention has the following structure:

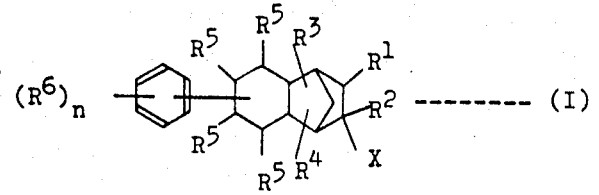

wherein each of $R^1$, $R^2$, $R^3$ and $R^4$ is a hydrogen atom or methyl group, $R^5$ represents a hydrogen atom or alkyl group having 1 to 4 carbon atoms and four $R^5$'s may be the same or different, $R^6$ is an alkyl group having 1 to 6 carbon atoms, $n$ is 0 or an integer of 1 to 5 and X is —CN, —CONH$_2$, —COOM or —COOR$^a$, M being a hydrogen atom, alkali metal, —NH$_4$ or organic amine residue, $R^a$ being an alkyl group having 1 to 4 carbon atoms.

The above-mentioned structure of the present resin can be ascertained by infrared absorption spectra, gel permeation chromatography, measurement of molecular weight by cryoscopic method, etc. As will be apparent from the molecular structure, the resin of this invention is similar to rosin or derivatives thereof in chemical structure, more specifically, in that it has one carboxyl group or a group derived therefrom and an alicyclic group. Moreover, the present resin is a resinous substance like rosin and is similar thereto in properties. Since the present resin has no unsaturated carbon-carbon bond in the alicyclic ring, moreover, it is as excellent as or superior to rosin in resistance to weather and heat.

Thus the resin of this invention resembles rosin or the derivatives thereof in molecular structure and in properties and can be used extensively in various fields as a substitute for rosin or its derivatives. Examples of the resin are as follows:

1. Resin represented by the formula (I) wherein X is COOM', M' being an alkali metal, —$NH_4$ or organic amine residue:

This resin is easily dispersible in water like rosin salts and can be used in the form of an aqueous solution as emulsifiers for emulsion polymerization, emulsifiers for wax, oil and resin emulsion and sizing agents for paper, and is especially advantageous for application as emulsifiers for synthetic rubbers, since disproportionation is not necessary unlike rosin. For application as sizing agents for paper, an improved sizing effect can be attained. Furthermore, a water-soluble metal salt such as calcium chloride is added to the alkali salt, followed by double decomposition obtain a metal salt, which is usable as a resin for printing inks and coating compositions.

2. Resin represented by the formula (I) wherein X is a carboxyl group:

When esterified with polyhydric alcohols, the resin is applicable to coating compositions and printing inks. Further, when calcium hydroxide, calcium acetate, zinc oxide, magnesium hydroxide or the like is added to this resin and the mixture is reacted in molten state, a resin is obtained which resembles an alkaline earth metal salt of rosin having a high softening point and which is useful for printing inks and coating compositions. When the resin is esterified with polyhydric alcohols, the resulting ester is employable for pressure sensitive adhesives, hotmelt adhesives and the like.

3. Resin represented by the formula (I) wherein X is a nitrile group:

The X is converted to amine by catalytic reduction. Like rosin amine, this resin can be used as polyamide modifying agents, adhesives, sterilizing agents, insecticides, antiseptics, emulsifiers of the cation type and sizing agents of the cation type for paper.

4. Resin represented by the formula (I) wherein X is an ester:

Interesterification of this resin with polyhydric alcohols yields a resin, which resembles ester gum for applications similar to those described above.

5. Resin represented by the formula (I) wherein X is a nitrile, amide, or ester group:

This resin is saponified with alkalis such as hydroxides of alkali metals, ammonia or organic amines into alkali salts of carboxylic acids which are usable in the same manner as (1) above. Hydrolysis with acids or saponification with alkalis, followed by acidification for conversion to carboxylic group assures the same applications as in the case of (2) above. Therefore this resin is a useful intermediate to produce the resin having the formula (I) wherein X is —COOM, M being as defined above.

Thus the resin of the invention can be used in various fields as substitutes for rosin and its derivatives. It is particularly preferable to employ the present resin in the form of aqueous solution of the alkali salt thereof as sizing agents and as emulsifiers for producing synthetic rubber by emulsion polymerization.

Of the present resins particularly preferable are those having the formula (I) above wherein each of $R^1$ and $R^2$ is hydrogen atom or methyl group, each of $R^3$ and $R^4$ is a hydrogen atom, each of $R^5$'s is a hydrogen atom or methyl group, each of $R^6$ is an alkyl group having 1 to 4 carbon atoms, n is 0 or an integer of 1 to 3 and X is —CN, —$CONH_2$, —COOM or —$COOR^a$, M and $R^a$ being as defined before.

The resin (I) of this invention can be prepared by reacting in the presence of a Friedel-Crafts catalyst 8-substituted tricyclo [4, 4, $1^{7.10}0^{1.6}$] undecene-3 derivative represented by the formula of

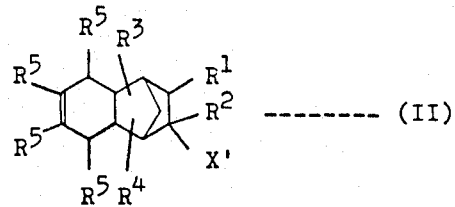

wherein $R^1$, $R^2$, $R^3$, $R^4$ and $R^5$ are the same as defined above and X' is —CN, —$CONH_2$, —COOH or —$COOR^a$, $R^a$ being the same as defined above with a benzene compound having the formula of

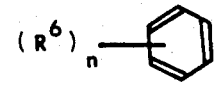

wherein $R^6$ and n are the same as defined above.

The 8-substituted tricyclo [4, 4, $1^{7.10}0^{1.6}$] undecene-3 derivative (II) to be used as a starting material can be synthesized by the method to be disclosed later using cyclopentadiene or an alkyl-substituted cyclopentadiene and an α, β-unsaturated monocarbonyl compound, which are easily available on a commerical scale.

The benzene compounds (III) to be used include benzene per se and alkyl benzenes having 1 to 5 alkyl groups of 1 to 6 carbon atoms. Perferable benzene compounds are those having the formula (III) above in which $R^6$ is an alkyl group of 1 to 4 carbon atoms and n is 0 or an integer of 1 to 3. Preferable examples of alkyl benzenes are toluene, xylene, ethyl benzene, 1, 2, 4-trimethyl benzene, 1, 3, 5-trimethyl benzene, 1,3-diethyl benzene, cymene, cumene, normal-propyl benzene, normal-butyl benzene, secondary-butyl benzene and tertiary-butyl benzene. The benzene compounds (III) can be used alone or in admixture with one another. For example, mixed xylene, mixed cumene and a mixture of aromatic compounds obtained by cracking of petroleum naphtha can also be employed for the purpose.

The Friedel-Crafts catalyst to be used includes conventional one such as hydrogen fluoride, phosphoric acid, sulfuric acid, boron trifluoride, boron trifluoride-etherate, born tribromite-phenolate, aluminum trichloride, aluminum tribromide, tin tetrachloride, zinc chloride, activated clay, silica-alumina, etc. Preferable catalysts are boron trifluoride, boron trifluoride-etherate, boron trifluoride-phenolate, aluminum trifluoride, aluminum tribromide, etc.

The reaction of the 8-substituted tricyclo [4, 4, $1^{7,10}0^{1,6}$] undecene derivative (II) with the benzene compound (III) can be conducted in the conditions similar to those in the conventional Friedel-Crafts reaction. That is to say, the starting materials are placed in an open or closed reactor and heated at a temperature of 0° to 300°C, preferably 20° to 200°C in the presence of a Friel-Crafts catalyst to produce the resin (I) of the present invention. The reaction usually terminates within 1 to 10 hours. In this reaction the amount of the benzene compound (III) to be used can vary over a wide range of from a theoretical amount to a large excess amount, since the excess amount of the benzene compound is serviceable as a solvent in the reaction free from undesired side reaction. The excess amount is usually up to 10 times the mole of the starting compound (II). Although other solvents can be employed in the reaction, there is no need in particular to use them, since the excess amount of the benzene compound (III) serves as a solvent. The amount of the catalyst to be used may also vary over a wide range, depending on the kinds of the starting compounds (II) and catalysts to be used, but usually in an amount of 1 to 100 wt%, based on the weight of the starting compound (II). The reaction pressure is usually atmospheric pressure, but increased pressure of up to 100 kg/cm² is applicable. The reaction can be conducted in air or in an inert gas such as nitrogen, hydrogen or carbon dioxide.

The resin thus produced can be separated from the resulting reaction mixture by inactivating the catalyst used in conventional manner, removing, if necessary, the inactivated catalyst by filtration or washing with water and distilling off unreacted substances and solvent, if used.

The starting 8-substituted tricyclo [4, 4, $1^{7,10}0^{1,6}$] undecene-3 derivative (II) can be prepared by Diels-Alder reactions from cyclopentadienes and $\alpha, \beta$-unsaturated monocarbonyl compounds. The reactions involved are shown in the following equations:

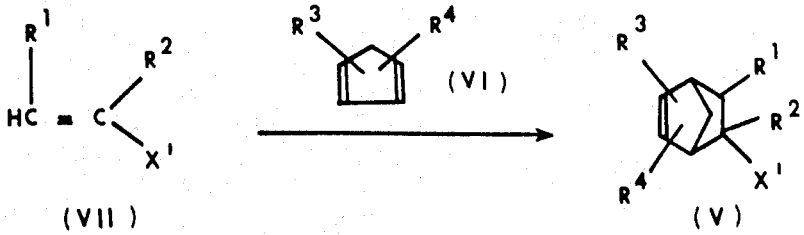

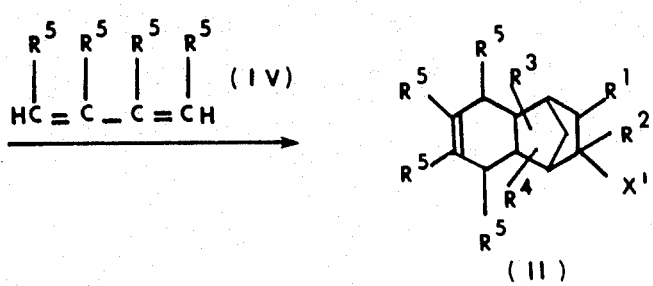

wherein $R^1$, $R^2$, $R^3$, $R^4$, $R^5$ and $X'$ are the same as defined above.

The cyclopentadienes (VI) are easily available from petrochemical industries on a commercial scale and include cyclopentadiene and methyl-substituted cyclopentadienes containing 1 to 2 methyl groups. Examples of methyl-substituted cyclopentadienes are, for instance, 1-methyl cyclopentadiene, 2-methyl cyclopentadiene, 5-methyl cyclopentadiene, etc.

Also employable are dicyclopentadiene, methyl-substituted dicylopentadienes, tricyclopentadiene and methyl-substituted tricyclo pentadienes which can produce the corresponding cyclopentadienes under the reaction conditions applied. Of these particularly preferable is, cyclopentadiene per se.

The $\alpha, \beta$-unsaturated monocarbonyl compounds (VII) include acrylic acid, methacrylic acid, crotonic acid and like $\alpha, \beta$-ethylenically unsaturated monocarboxylic acids and their derivatives capable of producing $\alpha, \beta$-ethylenically unsaturated monocarboxylic acids by hydrolysis thereof. Such derivatives are, for example, methyl acrylate, ethyl acrylate, isopropyl acrylate, butyl acrylate, methyl methacrylate, ethyl methacrylate, propyl methacrylate and like esters with lower alkanols having 1 to 4 carbon atoms, acrylonitrile, methacrylonitrile, crotononitrile and like nitriles, acrylamide, methacrylamide, crotonoamide and like amides, etc. Preferable are those having formula (VII) above in which both $R^1$ and $R^2$ are hydrogen or one of them is hydrogen and the other is methyl, and X is —CN or —COOR$^a$, R$^a$ being as defined above. Preferable examples are methyl acrylate, ethyl acrylate, methyl methacrylate, ethyl methacrylate, acrylonitrile, crotononitrile, methacrotononitrile, etc. The $\alpha, \beta$-unsaturated carbonyl compounds can be used alone or in admixture with one another.

The Diels-Alder reaction of cyclopentadienes (VI) with $\alpha, \beta$-unsaturated carbonyl compounds (VII) can be conducted in an open or closed vessel at a temperature ranging from 0° to 250°C, preferably from 10° to 200°C. The reaction pressure may be preferably an atmospheric pressure, although increased pressure or generated pressure is applicable. Usually the reaction is conducted in air, but the atmosphere of inert gas such as hydrogen, nitrogen or carbon dioxide is preferable, when the reaction is carried out at high temperatures. If necessary, there can be used organic solvents, such as, benzene, toluene, xylene, mineral terpene, normal hexane, cyclohexane, etc. Further polymerization inhibitors such as hydroquione, paratertiarybutyl catechol, hydroquinone monomethyl ether, etc. can be used, where necessary. The reaction is usually completed within 5 minutes to 20 hours, depending on the conditions applied. In this reaction it is preferable to use the α, β-unsaturated carbonyl compound (VII) in an amount of 0.9 to 2.0 moles per mole of the cyclopentadienes (VI).

The resulting 1 : 1 molar Diels-Alder addition product (V) of the cyclopentadienes and α, β-unsaturated compounds can be separated from the reaction mixture thus obtained by distilling off the unreacted materials and the solvents, if used. The addition product (V) per se can be isolated by distillation under a reduced pressure, if necesary.

The addition product (V) thus obtained is then reacted with an aliphatic conjugated diene (IV) to produce the starting 8-substituted tricyclo [4, 4, 1$^{7.10}$ 0$^{1.6}$] undecene-3 derivative (II). The aliphatic conjugated dienes (IV) are, for example, butadiene, 2-methyl-1,3-butadiene(isoprene), 1,3-pentadiene (piperylene), 3-methyl-1,3-pentadiene, etc. Preferable dienes are butadiene, isoprene, piperylene, etc. The dienes (IV) can be used singly or in admixture with one another. Therefore, a $C_4$ to $C_5$ fraction obtained by cracking of petroleum naphtha and containing a large amount of aliphatic conjugated dienes can be used as it is. Further, the dimers of the same or different dienes (IV) can also be used, since they can produce the dienes by thermal decomposition thereof under the reaction conditions. The Diels-Alder reaction between the addition product (V) and diene (IV) to produce 8-substituted tricyclo [4, 4, 1$^{7.10}$ 0$^{1.6}$] undecene-3 derivative (II) can be carried out by heating the reactants at a temperature of 100° to 300°C., preferably 150° to 250°C. The reaction usually is completed within 0.5 to 10 hours. In this reaction it is preferable to employ the diene in an amount of 0.5 to 2.0 moles per mole of the addition product (V). The reaction is conducted in the atmosphere of inert gas such as hydrogen, nitrogen or carbon dioxide. The reaction pressure may vary from atmospheric pressure to increased pressure of 100 Kg/cm². If necessary, there can be used polymerization inhibitors such as hydroquinone, paratertiarybutyl catechol, hydroquinone monomethyl ether, etc.

The 8-substituted tricyclo [4, 4, 1$^{7.10}$ 0$^{1.6}$] undecene-3 derivative (II) thus obtained can be separated from the resulting reaction mixture by distilling off the unreacted materials, low boiling substances and solvents, if used. The product (II) can be isolated by distillation under a reduced pressure, if necessary.

The present resin of the formula (I) wherein X is a nitrile group, amide group or ester group can be hydrolyzed or saponified with acid or alkali into carboxylic acid or its alkali salt. The resin containing free carboxyl group can be neutralized with alkali to produce alkali salt thereof. The hydrolysis or saponification is conducted under the same conditions as in the manner already known. The alkali to be used are, for example, lithium hydroxide, sodium hydroxide, potassium hydroxide, ammonia and organic amines such as methyl amine, ethyl amine, propyl amine, dimethyl amine, diethyl amine, dipropyl amine, trimethyl amine, triethyl amine, morpholine pyridine, monoethanol amine, diethanol amine, triethanol amine, etc.

As hereinafter disclosed, compositions containing the present resin having the formula (I) before can be used in various fields as a substitute for rosin and its derivatives. Particularly, compositions comprising aqueous medium and an alkali salt of the resin (I) dispersed therein are useful as emulsifying compositions for producing synthetic rubbers by emulsion polymerization and as sizing agents for paper. The alkali salts of the resins (I) include, for example, lithium, sodium, potassium, ammonium or organic amine salts of the resins (I).

The emulsifying compositions of the invention are in the form of aqueous dispersion containing the resins (I) dispersed in water and are applicable to produce various synthetic rubbers by emulsion polymerization, examples of the synthetic rubbers being styrene-butadiene rubber, chloroprene rubber, polybutadiene rubber, acrylonitrile-butadiene rubber, etc. The alkali salt of the resins (I) have a good water-solubility at low temperature and the aqueous dispersions thereof are excellent in storage stability at low temperature, so that the emulsifying compositions containing the same can be effectively used for producing cold rubber. Further, the resin (I) can impart tackiness to synthetic rubbers, which is superior to that of rosin soaps and, therefore, synthetic rubbers having excellent workability can be obtained using the present emulsifying composition. Further, the present emulsifying compositions are light in color and excellent in thermal and weather resistances, so that when they are used in emulsion polymerization synthetic rubbers having light color and excellent thermal and weather resistances are obtainable. According to the emulsifying compositions of the invention, moreover, it is possible to produce synthetic rubbers having high degree of polymerization.

The emulsifying compositions of the invention can be used as an emulsifiers for producing synthetic rubber by emulsion polymerization in the same manner as known emulsifiers of this kind, e.g., rosin soap. It may be employed alone or in combination with various conventional emulsifiers of this kind such as fatty acid soaps, synthetic surfactants, rosin soaps, etc.

The sizing compositions of the invention are also employed in the form of aqueous dispersion of alkali salt of the resins (I). Whereas conventional sizing agents containing modified petroleum resins require the addition of rosin in admixture therewith, the sizing agents of this invention exhibit an excellent sizing effect comparable to the fortified rosin size, without using rosin. However, rosin can be incorporated in the sizing compositions of this invention. Moreover, the sizing agents of this invention have an excellent stability during storage.

The sizing agents of the present invention can be used in the same manner as conventional sizing agents of the rosin or petroleum resin type, by internal addition as well as by surface sizing. It may be used conjointly with well-known sizing agents designed for internal addition or for surface sizing, such as rosin size, fortified rosin size, petroleum resin size, starch, protein, polyvinyl alcohol or the like.

The present resin (I) has no unsaturated carbon-carbon bond in the alicyclic ring and therefore has excellent weather and thermal resistance.

Examples of this invention are given below for a better understanding of the invention, in which all percentages are by weight.

The physical properties of the products shown in the examples were determined by the following methods of under the following conditions.

| | |
|---|---|
| 1. Gas chromatography | |
| Apparatus: | "Shimazu Gas Chromatograph, Model GC-3AF", equipped with a thermal conductive detector system (manufactured by Shimazu Seisakusho Ltd., Japan) |
| Length of column: | 3 m |
| Diameter of column: | 3 mm |
| Packings: | Silicon GE SE 30 |
| Column temp.: | 120°C or 300°C |
| Carrier gas: | $N_2$, 0.4 kg/cm$^2$ |
| Chart speed: | 10 mm/min. |
| Inlet temp.: | 200°C |
| 2. Gel permeation chromatography | |
| Apparatus: | "Shimazu Gel Permeation Chromatograph, Model IA" (manufactured by Shimazu Seisakusho Ltd., Japan) |
| Sample: | 0.3 wt.% solution in tetrahydrofuran |
| Injection amount: | 2.0 ml |
| Injection time: | 2 min. |
| Flow rate: | 1 ml/min. |
| Gel column: | SG 3-2-1-1 (the pore sizes of four gel columns, SG 3-2-1-1, are 4×10$^3$A, 2×10$^2$A, 2×10A and 2×10A respectively) |
| 3. Molecular weight | Cryoscopic method |
| 4. Softening point | Ring and Ball method |

The drawings referred to in the examples are as follows.

EXAMPLE 1

206.6 g of methyl acrylate was placed in a one-liter four-necked flask equipped with a stirrer, reflux condenser, dropping funnel and thermometer, and 184.8 g of cyclopentadiene was added thereto dropwise with stirring at room temperature over 2 hours. The mixture was then heated to 150°C and kept at that temperature for 1 hour to complete Diels-Alder reaction. After the unreacted substances were distilled off, the resulting mixture was subjected to further distillation under reduced pressure to give 356.2 g of 1 : 1 molar Diels-Alder addition product of cyclopenetadiene and methyl acrylate as a fraction boiling at 88° to 100°C/21 mm Hg. The addition product had the structure of

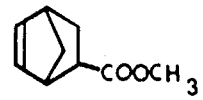

Molecular weight 147 (Theoretical value: 152).

Figure 1:
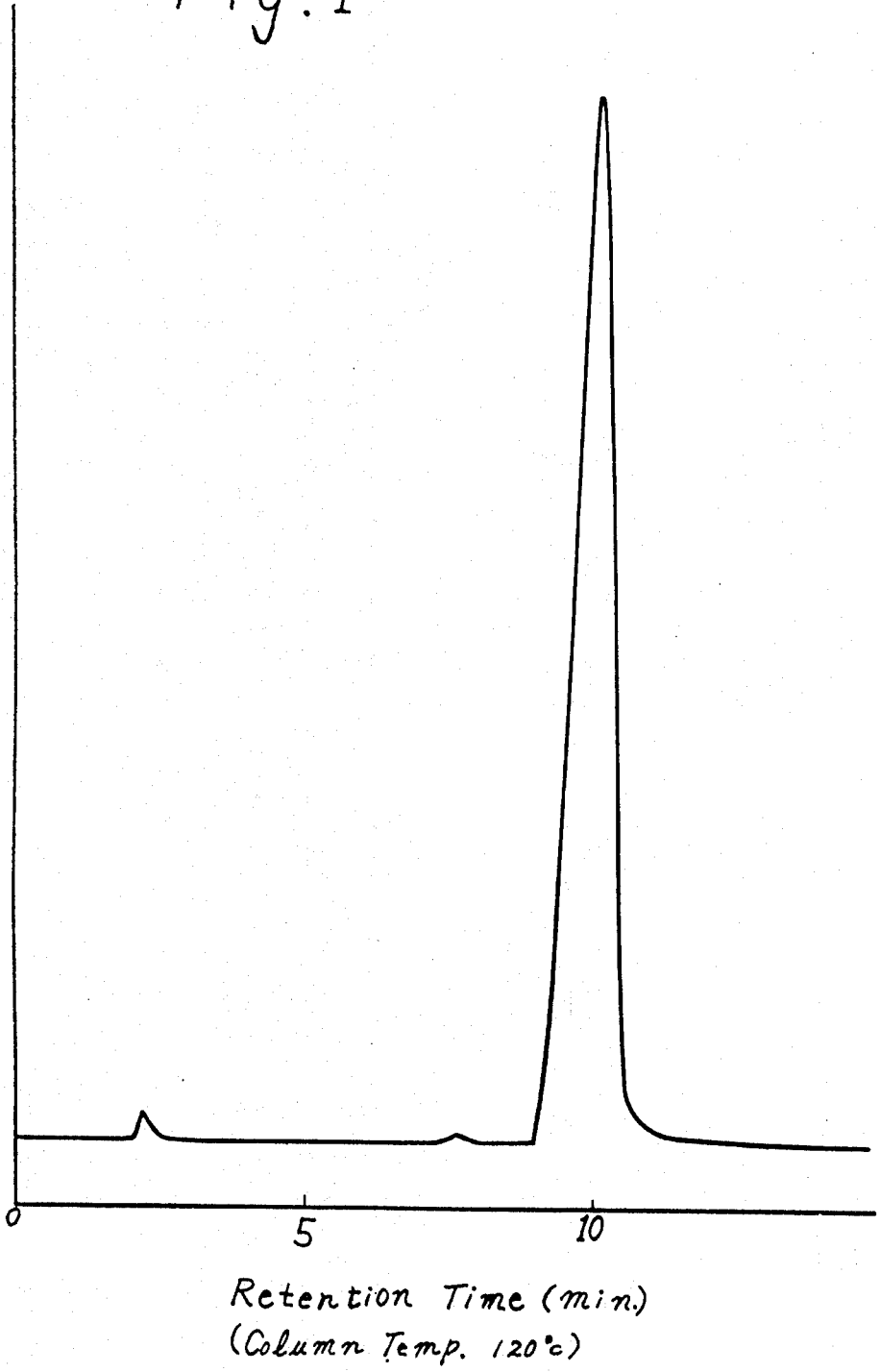
FIG. 1 shows the result of gas chromatography of Diels-Alder addition product of cyclopentadiene and methyl acrylate according to Example 1.

By infrared absorption analysis the addition product thus obtained showed absorptions at 1,730 cm$^{-1}$ and 1,040 cm$^{116\ 1}$ due to —COOCH$_3$ and at 715 cm$^{-1}$ due to norbornene ring. The gas chromatography (column temperature: 120°C) of the product gave the result shown in FIG. 1.

In an autoclave were placed 257 g of the resulting addition product (hereinafter referred to as "CPD-MA adduct"), 114 g of isoprene and 0.1 g of hydroquinone. After the air in the autoclave was replaced by nitrogen the mixture was heated at 200°C for 3 hours to effect Diels-Alder reaction. After the unreacted substances and low boiling substances were distilled off under reduced pressure, the resulting mixture was further subjected to distillation under reduced pressure to give 145.2 g of 1 : 1 molar Diels-Alder addition product of isoprene and CPD-MA adduct as an oily substance boiling at 120° to 164°C/5 mm Hg. Molecular weight 208 (Theoretical value: 220).

Figure 2:
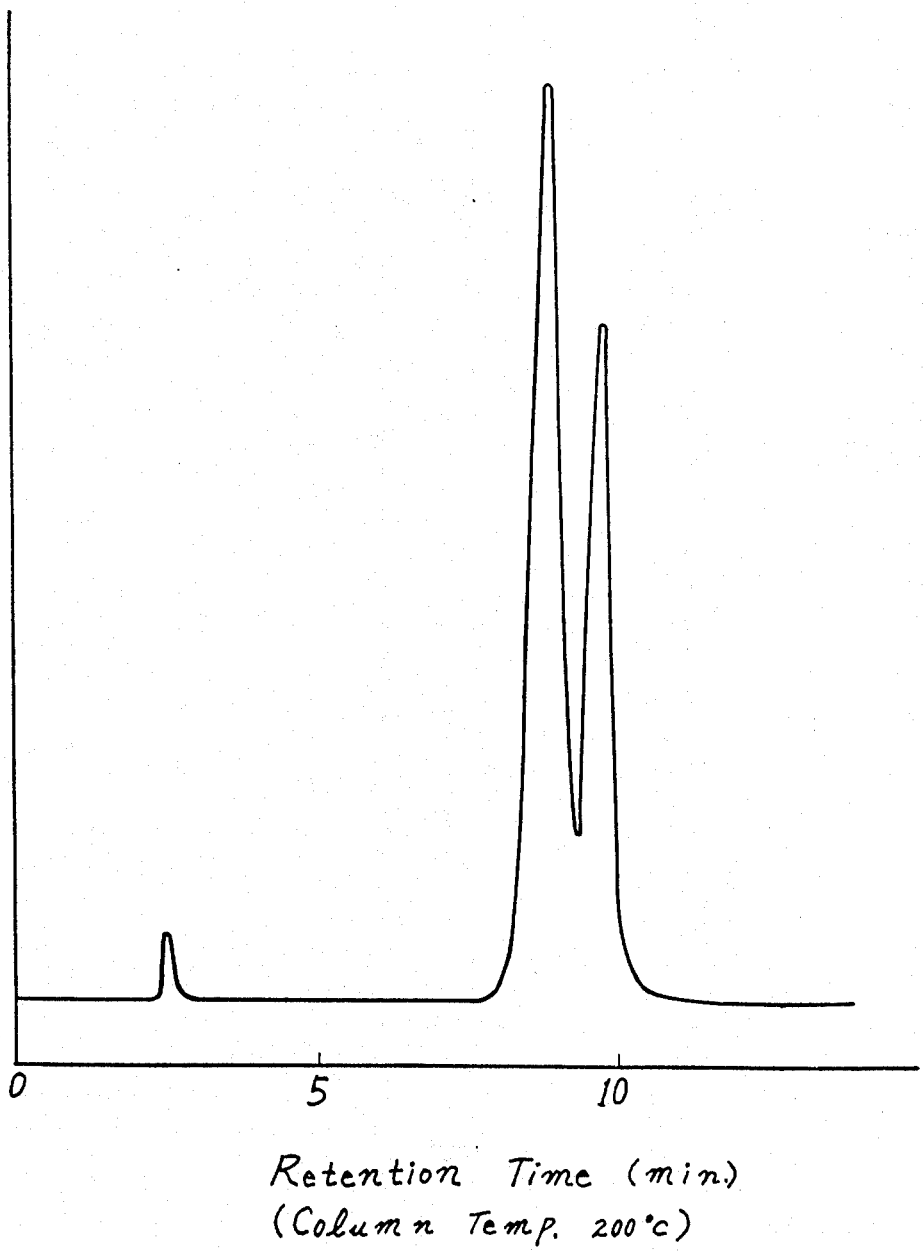
FIG. 2 shows the result of gas chromatography of Diels-Alder addition product of cyclopentadiene, methyl acrylate and isoprene according to Example 1.
Figure 3:
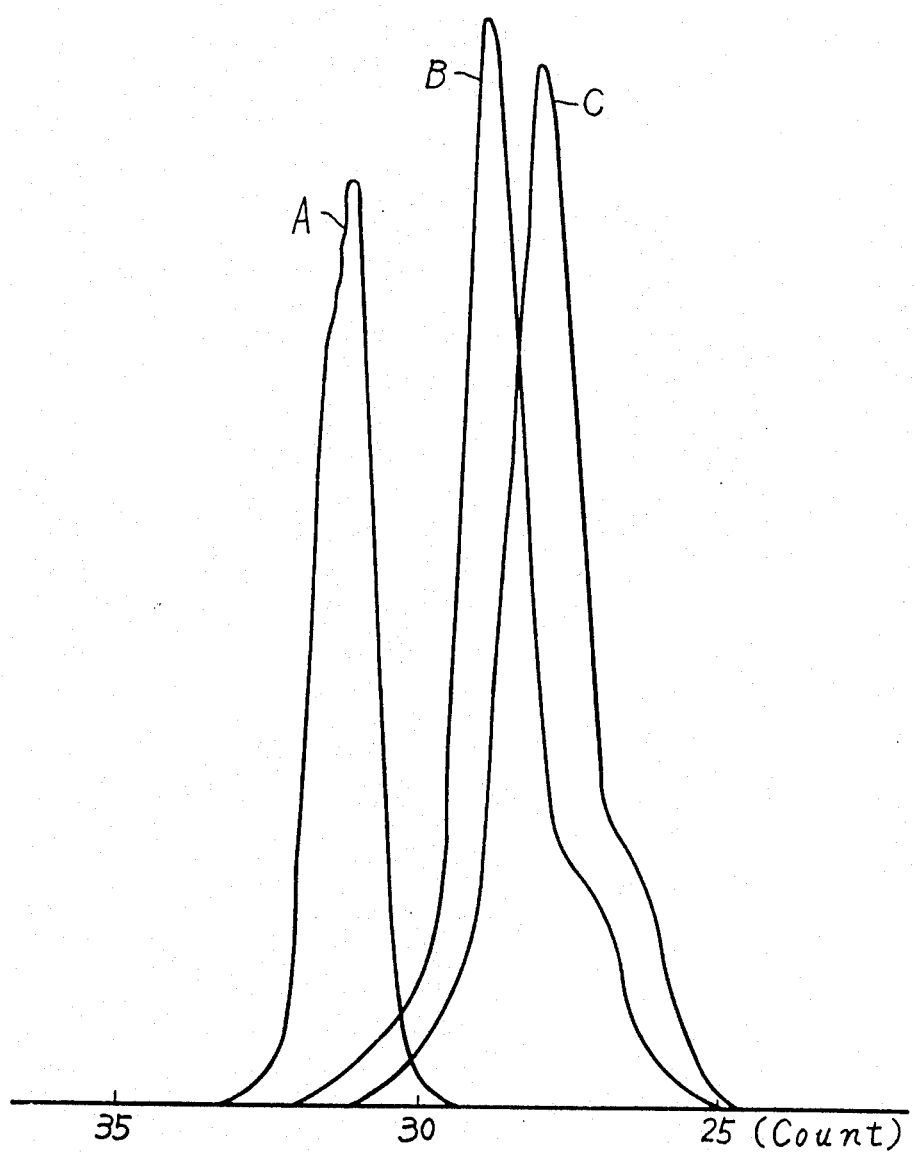
FIG. 3 shows the results of gel permeation chromatography of products obtained in each step of Example 1.

By infrared absorption analysis the resulting addition product showed absorptions at 1,730 cm$^{-1}$ and 1,040 cm$^{-1}$ due to —COOCH$_3$ and three absorptions in 750 to 800 cm$^{-1}$ due to double bond in the cyclohexene ring. The gas chromatography of the product gave the result shown in FIG. 2, from which the product was found to contain a stereoisomer. The gel permeation chromatography of the product gave the result shown as curve A in FIG. 3.

200 g of p-cymene and 30.3 g of aluminum trichloride were placed in a one-liter three-necked flask equipped with a stirrer, dropping funnel and thermometer. The mixture was kept at 50°C, to which 50 g of the addition product (hereinafter referred to as "CPD-MA-IP" adduct) obtained as above was added dropwise with stirring over 20 minutes. The resulting mixture was heated at 80°C for 3 hours to complete the reaction. After the reaction calcium hydroxide was added to the resulting reaction mixture to decompose the catalyst and the mixture was filtered to remove the decomposed catalyst, followed by washing with water. Removal of the unreacted substances and low boiling substances by distillation under reduced pressure gave 75.2 g of 1 : 1 molar addition product of p-cymene and CPD-MA-IP adduct.

The infrared absorption analysis of the resulting product gave absorpitons at 1,730 cm$^{-1}$ and 1,040 cm$^{-1}$ due to —COOCH$_3$ and 820 cm$^{-1}$ due to p-cymene, but three absorptions in 750 to 800 cm$^{-1}$ due to double bond in the cyclohexene ring were disappeared. The gel permeation chromatography of the resin gave the result shown as curve B in FIG. 3.

60 g of the addition product thus obtained was heated at 120°C, to which 40 g of 48% aqueous sodium hydroxide solution was added dropwise slowly to effect hydrolysis, while the methanol produced was distilled off. After the dropwise addition of the alkali the mixture was kept at 120°C for 2 hours and then diluted with water. After cooling, xylene was added to the mixture and unsaponified substance was removed by extraction. Thereafter, the resulting aqueous dispersion was made acidic with hydrochloric acid and the hydrolyzed product was extracted with xylene, washed with water and distilled to remove xylene, whereby 36.5 g of hydrolyzed addition product of p-cymene and CPD-MA-IP adduct was obtained as a resinous substance. The resin thus obtained had the following properties:

| Softening point | 78.5°C | |
|---|---|---|
| Acid value: | 159.4 | (Theoretical value: 165.1) |
| Molecular weight: | 352 | (Theoretical Value: 340) |

The infrared absorption analysis of the resin gave absorptions at 1,680 cm$^{-1}$ and 920 cm$^{-1}$ due to —COOH and at 820 cm$^{-1}$ due to p-cymene. The gel permeation chromatography gave the result shown as curve C in FIG. 3. The purity calcualted from the acid value and molecular weight was higher than 95 percent.

EXAMPLE 2

In a one-liter autoclave were placed 276 g of dicyclopentadiene, 212 g of acrylonitrile, 120 g of xylene and 0.1 g of hydroquinone. After the air in the autoclave was replaced by nitrogen, the mixture was heated at 170°C for 4 hours to effect Diels-Alder reaction. After the unreacted substances and xylene were distilled off, the resulting reaction mixture was further subjected to distillation under reduced pressure to give 453.8 g of 1 : 1 molar Diels-Alder addition product of dicyclopentadiene and acrylonitrile as a fraction boiling at 85° to 90°C/12 mm Hg. The resulting product had a molecular weight of 122 (theoretical value: 119) and a structure of

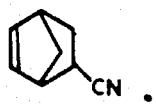

The infrared absorption analysis of the product gave absorptions of 2,250 cm$^{-1}$ due to —CN and at 715 cm$^{-1}$ due to norbornene ring.

In a two-liter autoclave were placed 298 g of the resulting addition product (hereinafter referred to as "CPD-AN adduct") and 300 g of piperylene. The air in the autoclave was replaced by nitrogen and the mixture was heated at 200°C for 3 hours to effect Diels-Alder reaction. After the unreacted substances were distilled off, the resulting reaction mixture was further subjected to distillation under reduced pressure to obtain 210.6 g of 1 : 1 molar Diels-Alder addition product of piperylene and CPD-AN adduct as an oily substance boiling at 120° to 138°C/5 mm Hg. The molecular weight of the product was 179 (theoretical value: 187).

Figure 4:
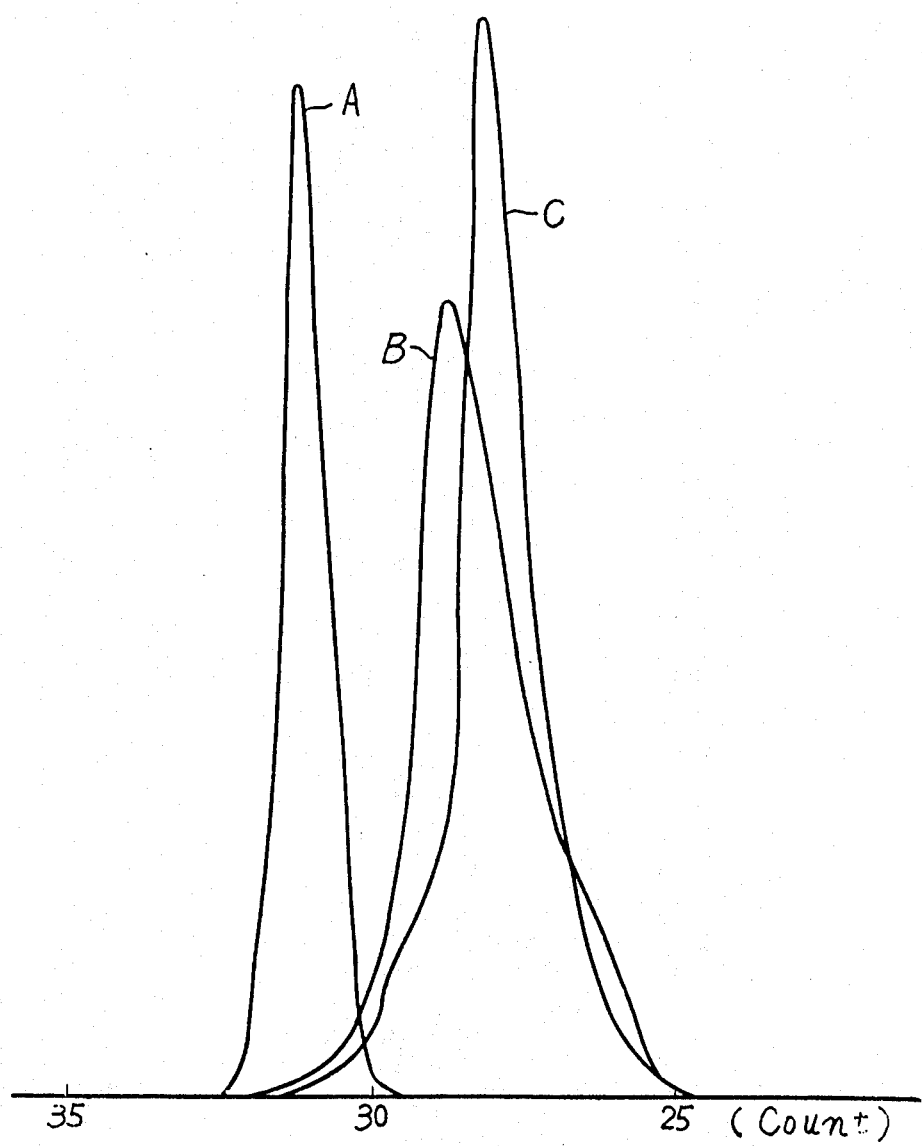
FIG. 4 shows the results of gel permeation chromatography of the products obtained in each step of Example 2.

The infrared absorption analysis gave absorption at 2,250 cm$^{-1}$ due to -CN and three absorptions in 750 to 800 cm$^{-1}$ due to double bond of the cyclohexane ring. The gel permeation chromatography of the product gave the result shown as curve A in FIG. 4.

200 g of p-cymene and 35.6 g of aluminum trichloride were placed in a one-liter three-necked flask equipped with a stirrer, dropping funnel and thermometer. While the mixture was kept at 50°C, 50 g of the addition product thus obtained (hereinafter referred to as "CPD-AN-PPL adduct") was added thereto dropwise over 30 minutes. The resulting mixture was heated at 80°C for 3 hours to complete the reaction. After cooling, calcium hydroxide was added to the reaction mixture to decompose the catalyst and the mixture was filtered to remove the decomposed catalyst, followed by washing with water. Removal of the unreacted substace under reduced pressure gave 54 g of resin. The resin was found to be a 1 : 1 molar addition product of p-cymene and CPD-AN-PPL adduct.

Infrared absorption analysis of the product gave absorptions at 2,250 cm$^{-1}$ due to -CN and at 820 cm$^{-1}$ due to p-cymene, but three absorptions in 750 to 800 cm$^{-1}$ due to cyclohexane ring was disappeared. The gel permeation chromatography thereof gave the result shown as curve B in FIG. 4.

50 g of the resin thus obtained was placed in an autoclave and potassium hydroxide was added thereto in an amount of 1.2 equivalent to the nitrile. The mixture was heated at 200°C for 1 hour to effect hydrolysis and thereafter the resulting mixture was treated in the same manner as in Example 1, whereby 41.5 g of hydrolyzed resin containing carboxyl group in the molecule and having the following properties was obtained.

| Acid value | 160.6 | (Theoretical value: 165.1) |
|---|---|---|
| Molecular weight | 349 | (Theoretical value: 340) |

Infrared absorption analysis of the product gave absorptions at 1,680 cm$^{-1}$ and 920 cm$^{-1}$ due to —COOH and at 820 cm$^{-1}$ due to p-cymene. The gel permeation chromatography of the product gave the result shown as curve C in FIG. 4. The purity thereof calculated from the acid value and molecular weight was higher than 95 percent.

EXAMPLE 3

In a one-liter autoclave were placed 200 g of the CPD-AN adduct obtained in Example 2 and 500 g of a fraction boiling at 20° to 55°C and having the following composition:

| Composition of the fraction used: | |
|---|---|
| Cis 1,3-pentadiene | 8.5% |
| Cyclopentadiene | 3.2% |
| Isoprene | 16.1% |
| Trans 1,3-pentadiene | 10.4% |
| Others (containing no conjugated dienes) | 61.8% |

The mixture was heated at 200°C for 3 hours to effect Diels-Alder reaction. After the unreacted substances were distilled off, the resulting reaction mixture was further subjected to distillation under reduced pressure to obtain 126.5 g of Diels-Alder addition product as oily substance boiling at 120° to 140°C/5 mm Hg. The molecular weight of the product was 198. The gel permeation chromatography of the product gave the result shown as curve A in FIG. 5.

50 g of the addition product was reacted with 200 g of ethylbenzene in the presence of 35.6 g of aluminum trichloride in the same manner as in Example 1. From the resulting reaction mixture 51.5 g of resin was separated in the same manner as in Example 1. The gel permeation chromatography of the resin gave the result shown as curve B in FIG. 5.

The resin thus obtained was hydrolyzed in the same manner as in Example 2 to give carboxyl group-containing resin having the following properties.

| Acid value | 173 |
|---|---|
| Molecular weight | 324 |

Figure 5:
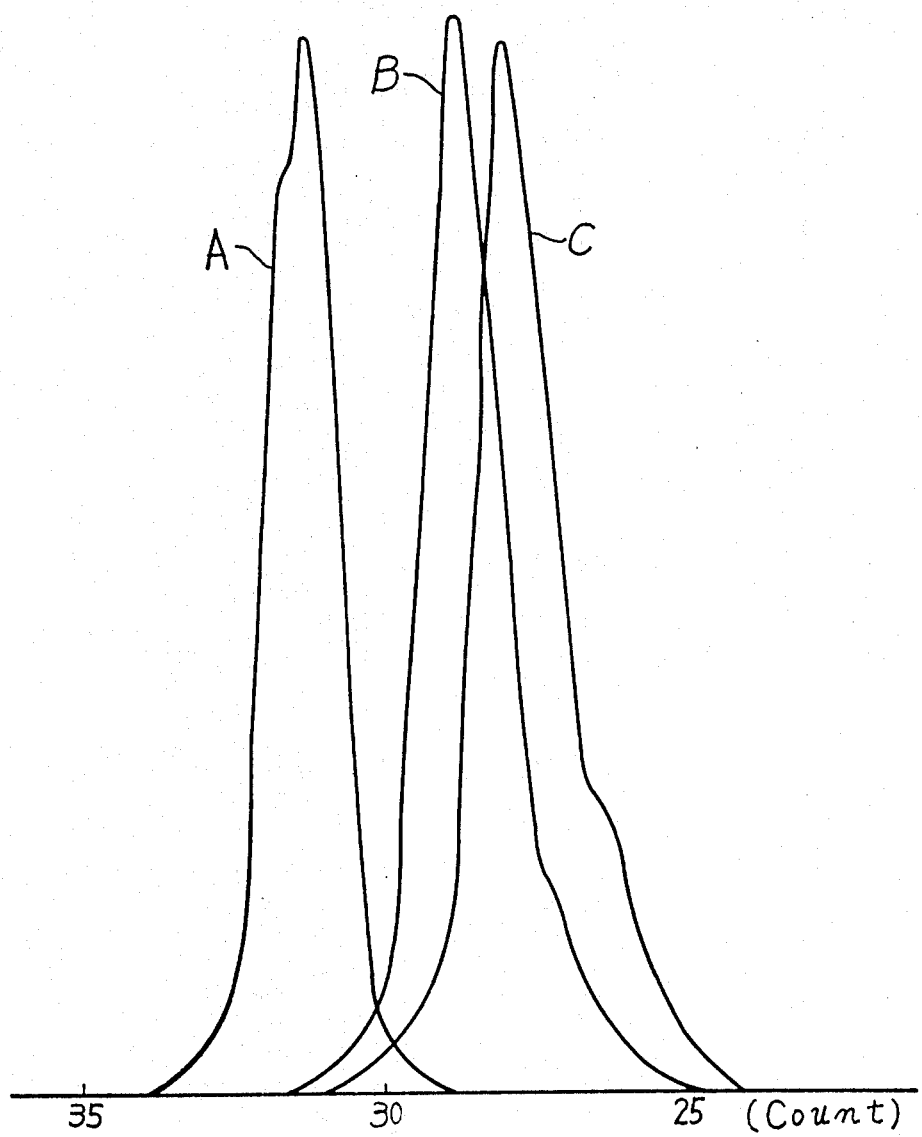
FIG. 5 shows the results of gel permeation chromatography of the products obtained in each step of Example 3.

The gel permeation chromatography of the resin gave the result shown as curve C in FIG. 5.

EXAMPLE 4

Figure 6:
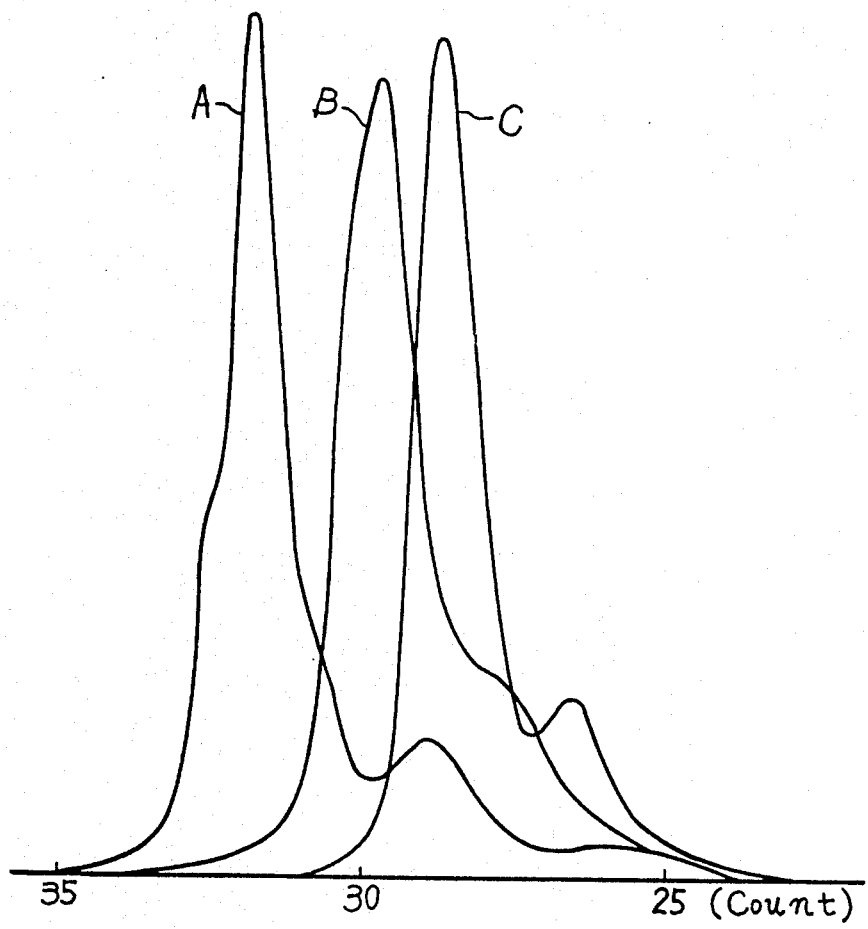
FIG. 6 shows the results of gel permeation chromatography of the products obtained in each step of Example 4.

In a one-liter autoclave were placed 132 g of dicyclopentadiene, 106 g of acrylonitrile, 100 g of xylene and 0.1 g of hydroquinone. After the air in the autoclave was replaced by nitrogen, the mixture was heated at 170°C for 3 hours to produce 1 : 1 molar addition product of cyclopentadiene and acrylonitrile (hereinafter referred to as CPD-AN adduct). The resulting reaction mixture was heated to 200°C, to which a mixture of 136 g of isoprene and 100 g of xylene was added over 1 hour. The mixture was further heated at that temperature for 2 hours to complete the reaction. Removal of unreacted substances and xylene by distillation gave 196 g of 1 : 1 molar Diels-Alder addition product of isoprene and CPD-AN adduct. The gel permeation chromatography thereof gave the result shown as curve A in FIG. 6.

300 g of xylene and 53.5 g of aluminum trichloride were placed in a one-liter three-necked flask equippped with a stirrer, dropping funnel and thermometer. The mixture was kept at 40°C, to which 115 g of the addition product obtained above (hereinafter referred to as CPD-AN-IP adduct) was added over 30 minutes. Then the mixture was heated at 80°C for 3 hours to complete the reaction. The resulting reaction mixture was treated in the same manner as in Example 1 and removal of unreacted substances and xylene by distillation gave 112 g of resin. The resin was found to be a 1 : 1 molar addition product of xylene and CPD-AN-IP adduct. The gel permeation chromatography of the resin gave the result shown as curve B in FIG. 6.

Aqueous solution of sodium hydroxide was added to the resin in an equimolar amount to the nitrile and the mixture was heated at 200°C for 1 hour for hydrolysis. The resulting mixture was diluted with water, and an oily substance and precipitate were removed. Then the mixture was made acidic with hydrochloric acid and the hydrolyzed resin was extracted with xylene. Removal of the xylene from the extract gave 98.5 g of the resin having the following properties:

| Molecular weight | 313 | (Theoretical value: 293) |
|---|---|---|
| Acid value | 160.4 | (Theoretical value: 181) |

Infrared absorption analysis of the product gave absorptions at 1,680 cm$^{-1}$ and 920 cm$^{-1}$ due to —COOH and at 820 cm$^{-1}$ due to xylene. The gel permeation chromatography thereof gave the result shown as curve C in FIG. 6.

EXAMPLE 5

In a three-liter autoclave were placed 1,000 g of methylmethacrylate, 661 g of cyclopentadiene and 12 g of hydroquinone monomethyl ether. The air in the autoclave was replaced by nitrogen and the mixture was heated at 180° to 190°C for 3 hours to effect Diels-Alder reaction. After unreacted substances were distilled off, the resulting reaction mixture was further subjected to distillation under reduced pressure to give 1,112 g of 1 : 1 molar Diels-Alder addition product of cyclopentadiene and methyl methacrylate as a fraction boiling at 90° to 115°C/27 mm Hg. The product had a structure of

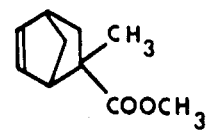

Molecular weight 173 (Theoretical value: 166).

Infrared absorption analysis thereof gave absorptions at 715 cm$^{-1}$ due to norbornene ring and at 1,730 cm$^{-1}$ and 1,040 cm$^{-1}$ due to —COOCH$_3$.

415.5 g of the resulting addition product (hereinafter referred to as "CPD-MMA adduct"), 170 g of isoprene and 0.1 g of hydroquinone were added in a one-liter autoclave. The air in the autoclave was replaced with nitrogen and the mixture was heated at 200°C for 3 hours to effect Diels-Alder reaction. After the unreacted substances were distilled off, the resulting reaction mixture was further subjected to distillation under reduced pressure to give 230 g of 1 : 1 molar Diels-Alder addition product of isoprene and CPD-MMA adduct as an oily substance boiling at 130° to 160°C/5 mm Hg. The molecular weight of the product was 251 (theoretical value: 234).

The infrared absorption analysis thereof gave absorptions at 1,730 and 1,040 cm$^{-1}$ due to —COOCH$_3$ and three absorptions in 750 to 800 cm$^{-1}$ due to cyclohexene ring.

200 g of cumene and 50 g of the addition product obtained as above (hereinafter referred to as "CPD-MMA-IP adduct") was placed in a one-liter three-necked flask equipped with a stirrer, dropping funnel and thermometer. While the mixture was kept at 50°C, 2.5 g of boron trifluoride-phenol complex was added thereto dropwise over 20 minutes. Then the mixture was heated to 100°C and kept at that temperature for 3 hours. After the reaction water was added to the resulting reaction mixture to decompose the catalyst, which was removed by washing with water. Thereafter, the unreacted substances were distilled off from the reaction mixture to give 68 g of resin. The resin was found to be a 1 : 1 molar addition product of cumene and CPD-MMA-IP adduct.

Infrared absorption analysis of the product gave absorptions at 1,730 cm$^{-1}$ and 1,040 cm$^{-1}$ due to —COOCH$_3$ and 820 cm$^{-1}$ due to cumene, but three absorptions in 750 to 800 cm$^{-1}$ due to cyclohexane ring were disappeared.

In a one-liter autoclave were placed 50 g of resin, 33 g of 48% aqueous potassium hydroxide solution and 125 g of water and the mixture was heated at 200°C for 1 hour. Thereafter, the resulting reaction mixture was treated in the same manner as in Example 1 to obtain 43.6 g of carboxyl-containing resin having the following properties:

| Molecular weight | 356 | (Theoretical value: 340) |
|---|---|---|
| Softening point | 82.5°C | |
| Acid value | 160 | (Theoretical value: 165) |

Infrared absorption analysis of the product gave absorptions at 1,680 cm$^{-1}$ and 920 cm$^{-1}$ due to —COOH and at 820 cm$^{-1}$ due to cumene.

EXAMPLE 6

In a three-liter autoclave were placed 990 g of cyclopentadiene, 670 g of crotononitrile and 0.3 g of hydroquinone. The air in the autoclave was replaced by nitrogen and the mixture was heated at 160 to 165°C for 8 hours to effect Diels-Alder reaction. After unreacted substances were distilled off, the resulting reaction mixture was further subjected to distillation under reduced pressure to obtain 804 g of 1 : 1 molar Diels-Alder addition product of cyclopentadiene and crotononitrile as a fraction boiling at 85 to 95°C/11 mm Hg. The product had a structure of

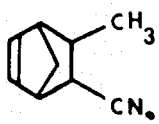

Molecular weight 139 (Theoretical value: 133).

Infrared absorption analysis thereof gave absorptions at 2,250 cm$^{-1}$ due to —CN and at 715 cm$^{-1}$ due to norbornene ring.

133 g of the resulting addition product (hereinafter referred to as "CPD-CN adduct") and 82 g of 2,4-hexadiene were placed in a one-liter autoclave. After the air in the autoclave was replaced by nitrogen, the mixture was heated at 200°C to effect Diels-Alder reaction. After unreacted substances were distilled off, the resulting reaction mixture was further subjected to distillation under reduced pressure to obtain 77.5 g of 1 : 1 molar Diels-Alder addition product of 2,4-hexadiene and CPD-CN adduct as an oily substance boiling at 140° to 170°C/5 mm Hg. The molecular weight of the product was 237 (theoretical value: 215). Infrared absorption analysis thereof gave absorption at 2,250 cm$^{-1}$ due to —CN and three absorptions in 750 to 800 cm$^{-1}$ due to cyclohexene ring.

200 g of benzene and 31.0 g of aluminum trichloride were placed in a one-liter four-necked flask equipped with a stirrer, dropping funnel, reflux condenser and thermometer. While the mixture was kept at 50°C, 50 g of the addition product obtained as above (hereinafter referred to as "CPD-CN-HD adduct") was added thereto dropwise over 30 minutes. Thereafter, the mixture was heated at 80°C for 3 hours to complete the reaction. After cooling, a mixture of calcium hydroxide and water was added to the resulting mixture to decompose the catalyst and the mixture was filtered to remove the decomposed catalyst, followed by washing with water. Removal of unreacted substances by distillation gave 51.5 g of resin. The resin was found to be a 1 : 1 molar addition product of benzene and CPD-CN-HD adduct.

Infrared absorption analysis of the product gave absorptions at 2,250 cm$^{-1}$ due to —CN and at 820 cm$^{-1}$ due to benzene ring and three absorptions in 750 to 800 cm$^{-1}$ due to cyclohexene ring were disappeared.

In a one-liter autoclave were placed 50 g of the resin thus obtained, 40 g of 48% aqueous potassium hydroxide solution and 152 g of water, and the mixture was heated at 200°C for one hour for hydrolysis. The resulting reaction mixture was then treated in the same manner as in Example 1 to obtain 34.7 g of carboxyl-containing resin having the following properties:

| | | |
|---|---|---|
| Acid value | 171 | (Theoretical value: 180) |
| Molecular weight | 318 | (Tehoretical value: 312) |

Infrared absorption analysis of the product gave absorptions at 1,680 cm$^{-1}$ and 920 cm$^{-1}$ due to —COOH and at 820 cm$^{-1}$ due to benzene ring.

EXAMPLE 7

320 g of CPD-MA adduct obtained in Example 1, 111 g of butadiene and 0.1 g of hydroquinone were placed in a one-liter autoclave. The air in the autoclave was replaced by nitrogen and the mixture was heated at 200°C for 3 hours to effect Diels-Alder reaction. Removal of unreacted substances and low-boiling substances by distillation gave 138 g of 1 : 1 molar Diels-Alder addition product of butadiene and CPD-MA adduct. The molecular weight of the product was 213 (theoretical value: 206).

Infrared absorption analysis gave absorptions at 1,730 cm$^{-1}$ and 1,040 cm$^{-1}$ due to —COOCH$_3$ and three absorptions in 750 to 800 cm$^{-1}$ due to cyclohexene ring.

50 g of the addition product thus obtained (hereinafter referred to as "CPD-MA-BD adduct") and 200 g of toluene were placed in a one-liter autoclave equipped with a stirrer, dropping funnel, reflux condenser and thermometer. While the resulting mixture was kept at 50°C, 2.5 of boron trifluoride-ether complex was added over 20 minutes. Then the mixture was heated at 100°C for 3 hours. After the reaction water was added to the resulting reaction mixture to decompose the catalyst, followed by washing with water. Removal of unreacted substances gave 63.5 g of resin. The resin was found to be a 1 : 1 molar addition product of toluene and CPD-MA-BD.

Infrared absorption analysis of the product gave absorptions at 1,730 cm$^{-1}$ and 1,040 cm$^{-1}$ due to —COOCH$_3$ and at 820 cm$^{-1}$ due to toluene but three absorptions in 750 to 800 cm$^{-1}$ due to cyclohexene ring were disappeared.

50 g of the resin thus obtained was heated to 120°C and 39.2 g of 48% aqueous solution of potassium hydroxide was slowly added thereto dropwise, while methanol produced was distilled off. The mixture was kept at that temperature for 2 hours to complete hydrolysis and diluted with water. The resulting mixture was treated in the same manner as in Example 1 to give 43.0 g of carboxyl-containing resin having the following properties:

| | | |
|---|---|---|
| Molecular weight | 299 | (Theoretical value: 284) |
| Softening point | 76.1°C | |
| Acid value | 190.2 | (Theoretical value: 197.6) |

Infrared absorption analysis of the product gave absorptions at 1,680 cm$^{-1}$ and 920 cm$^{-1}$ due to —COOH and at 820 cm$^{-1}$ due to toluene.

The resins of this invention were tested in respect of its application as an emulsifier for emulsion polymerization of synthetic rubber and a sizing composition according to the following methods, with the results given below.

1. Emulsifying composition

To the resins obtained in Examples 1 to 7 was respectively added aqueous solution of potassium hydroxide in equimolar amounts to the resins. The resultant products were diluted with water to produce 7 kinds of aqueous compositions having concentration of 25 percent. Each composition was used as an emulsifier for emulsion polymerization according to cold rubber sulfoxylate formulation shown in Table 1 to obtain SBR. The conversion and stability of latex are respectively shown in Tables 2 and 3.

Table 1

| Materials used | Names of materials used | Proportions parts by weight |
|---|---|---|
| Monomer | Butadiene | 70 |
|  | Styrene | 30 |
| Dispersing medium | Deionized water (degassed) | 200 |
| Emulsifier | Aqueous solution of resin of Examples (as solid) | 4.0 |
|  | Naphthalene-formaldehyde resin sodium sulfonate | 0.15 |
| Molecular weight adjusting agent | Tertiary dodecylmercaptan | 0.18 |
| Polymerization initiator |  |  |
| Oxidizing agent | p-Methane hydroperoxide |  |
| Reducing agent | Ferrous sulfate (heptahydrate) | 0.08 |
|  |  | 0.0125 |
| Secondary reducing agent | Sodium formaldehyde sulfoxylate | 0.15 |
| Chelating agent | EDTA · 4Na | 0.07 |
| Electrolyte | Sodium phosphate (dodecahydrate) | 0.8 |

Polymerization conditions
Polymerization temperatures: 5°C.
Reaction time: 9 hours.
In nitrogen atmosphere.
Conversion
Table 2 gives conversion, in which is also shown that obtained in exactly the same manner as above, using a commercial disproportionated rosin emulsifier.

Table 2

| Emulsifier | Conversion (%) |
|---|---|
| Example 1 | 60.2 |
| Example 2 | 61.6 |
| Example 3 | 59.4 |
| Example 4 | 58.0 |
| Example 5 | 60.3 |
| Example 6 | 58.2 |
| Example 7 | 59.8 |
| Commercial disproportionated rosin emulsifier | 61.8 |

Stability test of latex
50 g of 25% aqueous solution of the latex obtained in the above polymerization was placed in a container and subjected to mechanical shearing force at a temperature of 25°C for 5 minutes, under a load of 5 kg and at a rotational speed of 1000 r.p.m. The resulting coagulation was filtered by an 80-mesh stainless screen and dried to determine the rate of the coagulation formed.

$$\text{Rate of coagulation formed (\%)} = \frac{\text{Weight of coagulation dried}}{12.5} \times 100$$

The smaller the rate of coagulation formed, the more stable is the latex.
Table 3 shows the result in comparison with that obtained with the use of the commercial disproportionated rosin emulsifier.

Table 3

| Emulsifier | Rate of coagulation formed (%) |
|---|---|
| Example 1 | 1.9 |
| Example 2 | 2.0 |
| Example 3 | 2.7 |
| Example 4 | 3.1 |
| Example 5 | 1.8 |
| Example 6 | 2.8 |
| Example 7 | 2.4 |
| Commercial disproportionated rosin emulsifier | 2.5 |

2. Sizing Composition

To the resins obtained in Examples 1 to 7 were respectively added dropwise aqueous solution of potassium hydroxide in amounts equivalent to acid values of the resins. The resultant products were diluted with water to produce 7 kinds of aqueous compositions having concentration of 30 percent.

Sizing effect
Each composition was added in an amount as shown in Table 4 to L-BKP, having a beating degree of 29.0°SR and adjusted to a concentration of 1 wt.%. Thereafter, an aqueous solution of aluminum sulfate was further added to the pulp in an amount of 2.5 wt.% based on the pulp and the mixture was thoroughly agitated. The resulting stock was made into a sheet on a TAPPI Standard Sheet Machine and dried at a predetermined temperature for 5 minutes. The resulting paper sheet, weighing 60± 1 g/m², was tested for sizing effect by Stockight method, after being left to stand at 20°C and at 65% RH for 24 hours. The results are shown in Table 4 below, which also show the result obtained in the same manner as above using commercial fortified rosin size.

Table 4

| Drying Temp. (°C) | (Sizing effect in second) 100 | | | 80 |
|---|---|---|---|---|
| Amount of sizing* Comp. (%) | 0.3 | 0.5 | 1.0 | 0.3 |
| Example 1 | 23.6 | 29.6 | 34.2 | 21.4 |
| Example 2 | 24.1 | 28.8 | 35.0 | 22.2 |
| Example 3 | 21.8 | 27.2 | 33.3 | 20.0 |
| Example 4 | 21.0 | 25.4 | 31.7 | 19.8 |
| Example 5 | 24.2 | 28.5 | 34.7 | 22.6 |
| Example 6 | 19.1 | 23.7 | 29.5 | 17.8 |
| Example 7 | 20.3 | 25.1 | 30.8 | 18.9 |
| Commercial sizing agent | 20.6 | 25.7 | 30.5 | 19.1 |

Note:
*The amount of sizing composition is percent in solid weight, based on the pulp.

What we claim is:
1. A resin having a formula of

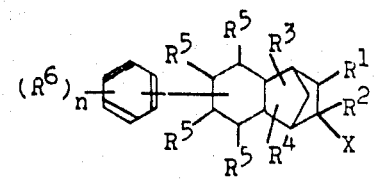

wherein each of $R^1$, $R^2$, $R^3$ and $R^4$ is a hydrogen atom or methyl group, $R^5$ represents a hydrogen atom or alkyl group having 1 to 4 carbon atoms and four $R^5$'s may be the same of different, $R^6$ is an alkyl group having 1 to 6 carbon atoms, $n$ is 0 or an integer of 1 to 5 and X is —COOM or —COOR$^a$, M being a hydrogen atom, alkali metal, —NH$_4$ or organic amine residue, R$^a$ being an alkyl group having 1 to 4 carbon atoms.

2. The resin according to claim 1, in which said X is —COOM, M being a hydrogen atom, alkali metal, —NH$_4$ or organic amine residue.

3. The resin according to claim 2, in which said M is an alkali metal, —NH$_4$ or organic amine residue.

4. The resin according to claim 2, in which said M is a hydrogen atom.

5. The resin according to claim 1, in which said X is —COOR$^a$, R$^a$ being an alkyl group having 1 to 4 carbon atoms.

6. The resin according to claim 1, in which each of said $R^1$ and $R^2$ is a hydrogen atom or methyl group, each of said $R^3$ and $R^4$ is a hydrogen atom, each of four $R^5$'s is a hydrogen atom or methyl group, each of $R^6$ is an alkyl group having 1 to 4 carbon atoms, $n$ is 0 or an integer of 1 to 3 and X is —COOM or —COOR$^a$, M being a hydrogen atom, alkali metal, —NH$_4$ or organic amine residue, R$^a$ being an alkyl group having 1 to 4 carbon atoms.

* * * * *